United States Patent [19]

Spear

[11] Patent Number: 5,185,739

[45] Date of Patent: Feb. 9, 1993

[54] TIME-ALLOCATION OF RADIO CARRIERS

[75] Inventor: Stephen L. Spear, Skokie, Ill.

[73] Assignee: Motorola, Inc., Schaumburg, Ill.

[21] Appl. No.: 485,420

[22] Filed: Feb. 27, 1990

[51] Int. Cl.$^5$ ............................................... H04J 3/16
[52] U.S. Cl. ................................... 370/95.3; 379/59
[58] Field of Search ................... 370/95.3, 18, 95.1, 370/18, 50; 379/79, 59, 58; 455/54

[56] References Cited

U.S. PATENT DOCUMENTS

| | | | |
|---|---|---|---|
| 4,128,740 | 12/1978 | Graziano | 455/54 |
| 4,144,411 | 3/1979 | Frenkiel | 379/59 |
| 4,688,210 | 8/1987 | Eizenhöffer | 370/18 |
| 4,765,753 | 8/1988 | Schmidt | 370/18 |
| 4,799,252 | 1/1989 | Eizenhöffer | 379/59 |
| 4,866,710 | 9/1989 | Schaeffer | 370/95.1 |
| 4,955,082 | 9/1990 | Hattori | 370/95.1 |
| 4,972,506 | 11/1990 | Uddenfeldt | 370/95.5 |
| 5,023,900 | 6/1991 | Taylor et al. | 379/59 |

Primary Examiner—Douglas W. Olms
Assistant Examiner—T. Samuel
Attorney, Agent, or Firm—Raymond J. Warren; F. John Motsinger

[57] ABSTRACT

In a TDMA cellular system, there is provided a mechanism for splitting the allocation of time slots within a TDM frame between adjacent coverage areas. There is provided a method of and apparatus for time-allocation of TDMA channels. It comprises: periodically allocating some portion of a carrier of radio traffic to one coverage area during one time interval and periodically allocating some other portion of that same carrier to another coverage area during a substantially non-overlapping time interval, all in time synchronism with any proximal reuse of that carrier. The distribution of channels in adjacent coverage areas thereby approaches parity and the minimum channel capacity per coverage area is enchanced.

12 Claims, 3 Drawing Sheets

TIME-ALLOCATION OF RADIO CARRIERS

THE FIELD OF INVENTION

This invention is concerned with time-allocation of cellular radio carriers.

More particularly, in a TDMA cellular system, this invention is concerned with splitting the allocation of time slots within a TDM frame between adjacent coverage areas.

BACKGROUND OF THE INVENTION

Currently proposed FDMA/TDMA cellular radio-telephone systems are spectrally inefficient due to an undesirable granularity in their channel allocation.

Traditionally, in cellular systems, as capacity is needed at any cell site, additional frequencies are more or less permanently and fixedly allocated to that cell. In Time Division Multiple Access (TDMA) systems, like the next generation digital cellular system in Europe commonly known as GSM Pan-European Digital Cellular, each carrier has multiple (eight) time slots in each sequentially repeating time frame. Each slot represents a single channel of radio traffic capacity. Thus, channel capacity would ordinarily and naturally be added on a modulo-eight basis with the addition of each carrier, in others words—a granularity of eight.

This granularity-by-eight is spectrally inefficient because overall nominal system capacity and planning is based upon providing the minimum number of traffic channels to serve the expected, offered load in a given area. Yet adjacent coverage areas might well exceed this nominal capacity by one or two orders of magnitude (modulo-eight) due to this granularity. This is a particular problem in FDMA/TDMA systems because a fixed number of time slots per repeating frame are allocated every time a new carrier is allocated to a coverage area.

Others attempted to solve somewhat analogous capacity problems in FDMA systems by load shedding, or sharing carriers between adjacent sectors of a cell, but such frequency sharing disturbs the regular cellular frequency reuse pattern and causes co-channel interference. Cellular systems require a certain geographic separation of reused frequencies to avoid undo interference. In other words, the level of co-channel interference (carrier-to-interference ratio) experienced by a cellular subscriber from a proximal reuse of that same carrier frequency establishes the distance at which co-channel, omni-directional antenna sites are allowed to exist, while the predictability of the directivity of sectored antennas serves to reduce the reuse distance (see U.S. Pat. No. 4,128,740 to Graziano and assigned to the instant assignee). Sharing a carrier frequency from its intended orientation to an adjacent sector of unintended orientation adversely affects the interference in that direction.

This invention takes as its object to overcome these shortcomings and to realize certain advantages presented below.

According to this invention, to even the granularity-induced discontinuities between adjacent coverage areas and to provide additional capacity as needed, certain time slots from one frame are allocated to one coverage area while other time slots in the frame are allocated to another coverage area.

SUMMARY OF THE INVENTION

In a TDMA cellular system, there is provided a mechanism for splitting the allocation of time slots within a TDM frame between adjacent coverage areas. There is provided a method of and apparatus for time-allocation of TDMA channels. It comprises: periodically allocating some portion of a carrier of radio traffic to one coverage area during one time interval and periodically allocating some other portion of that same carrier to another coverage area during a substantially nonoverlapping time interval, all in time synchronism with any proximal reuse of that carrier. The distribution of channels in adjacent coverage areas thereby approaches parity and the minimum channel capacity per coverage area is enhanced.

DESCRIPTION OF THE DRAWINGS

Additional objects, features and advantages of the invention will be more clearly understood and the best mode contemplated for practicing it in its preferred embodiment will be appreciated (by way of unrestricted example) from the following detailed description, taken together with the accompanying drawings in which.

DETAILED DESCRIPTION

Figure 1:
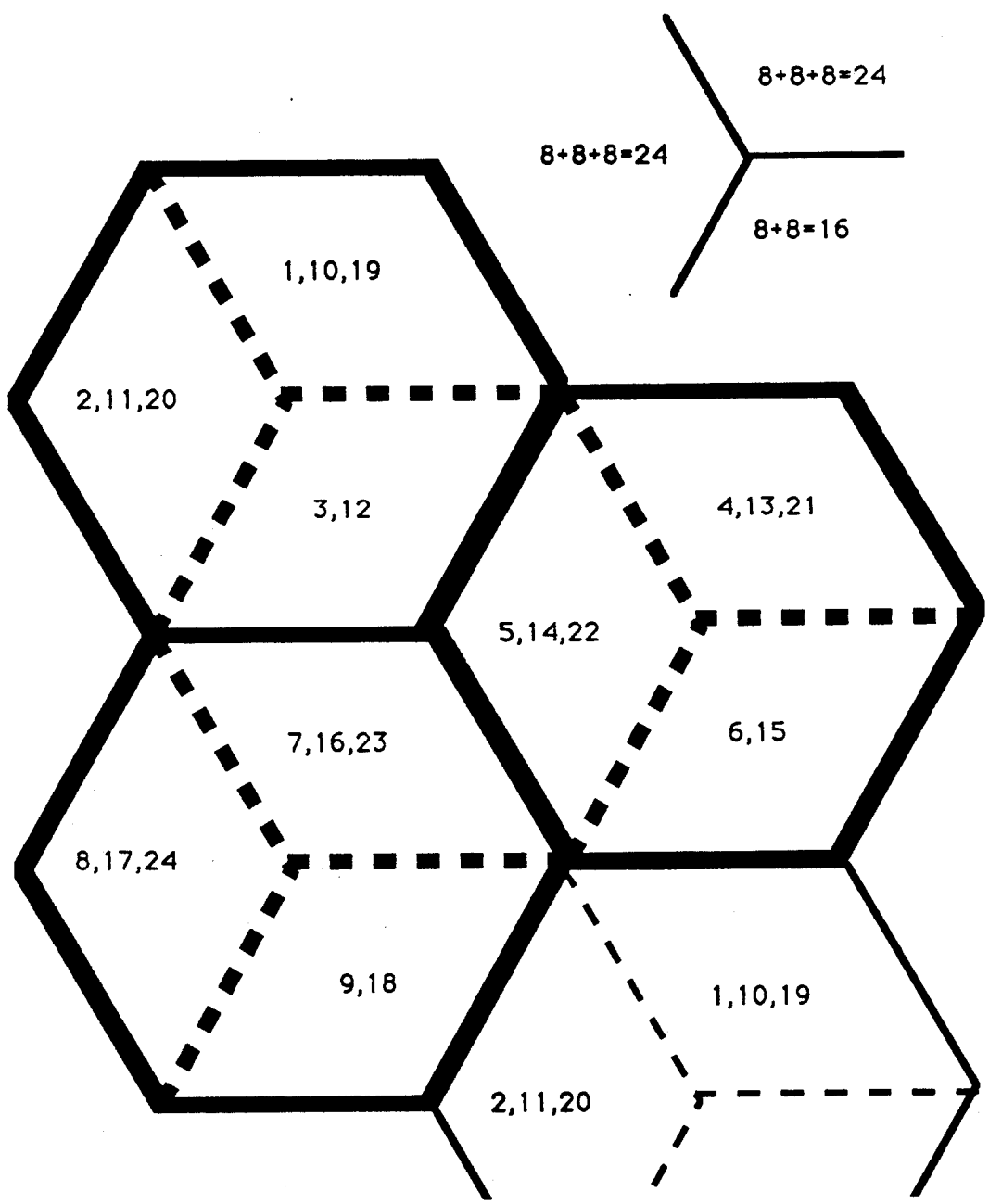
FIG. 1 is a cellular frequency planning diagram of the network in which the preferred embodiment of the invention operates.

FIG. 1 is a cellular frequency planning diagram of the network in which the preferred embodiment of the invention operates.

FIG. 1 illustrates what would occur in a three cell site, nine-sector cellular repeat pattern if a set of twenty-four carrier frequencies were conventionally distributed such that every sector had roughly the same frequency capacity. The uneven division of 24 carriers by 9 leaves six sectors with three carriers each and three sectors with two carriers each. This doesn't seem quite so lopsided (because disparities of one were not conventionally thought to be divisible) until one realizes that in a TDM environment, each carrier frequency contains eight traffic channels. Thus, the real capacity disparity is not 3:3:2 or one channel, but eight times that, or 24:24:16—a channel capacity disparity of eight. Frequency disparities of one were not thought to be divisible (other than by "sector sharing" with its attendant interference penalty), but time slot disparities of eight are readily divisible and capable of being reallocated to provide additional capacity and raise the local minimum channel capacity from 16 (basing system capacity on 24 channels per coverage area would have caused one-third of the system to have been constantly overloaded).

Figure 2:
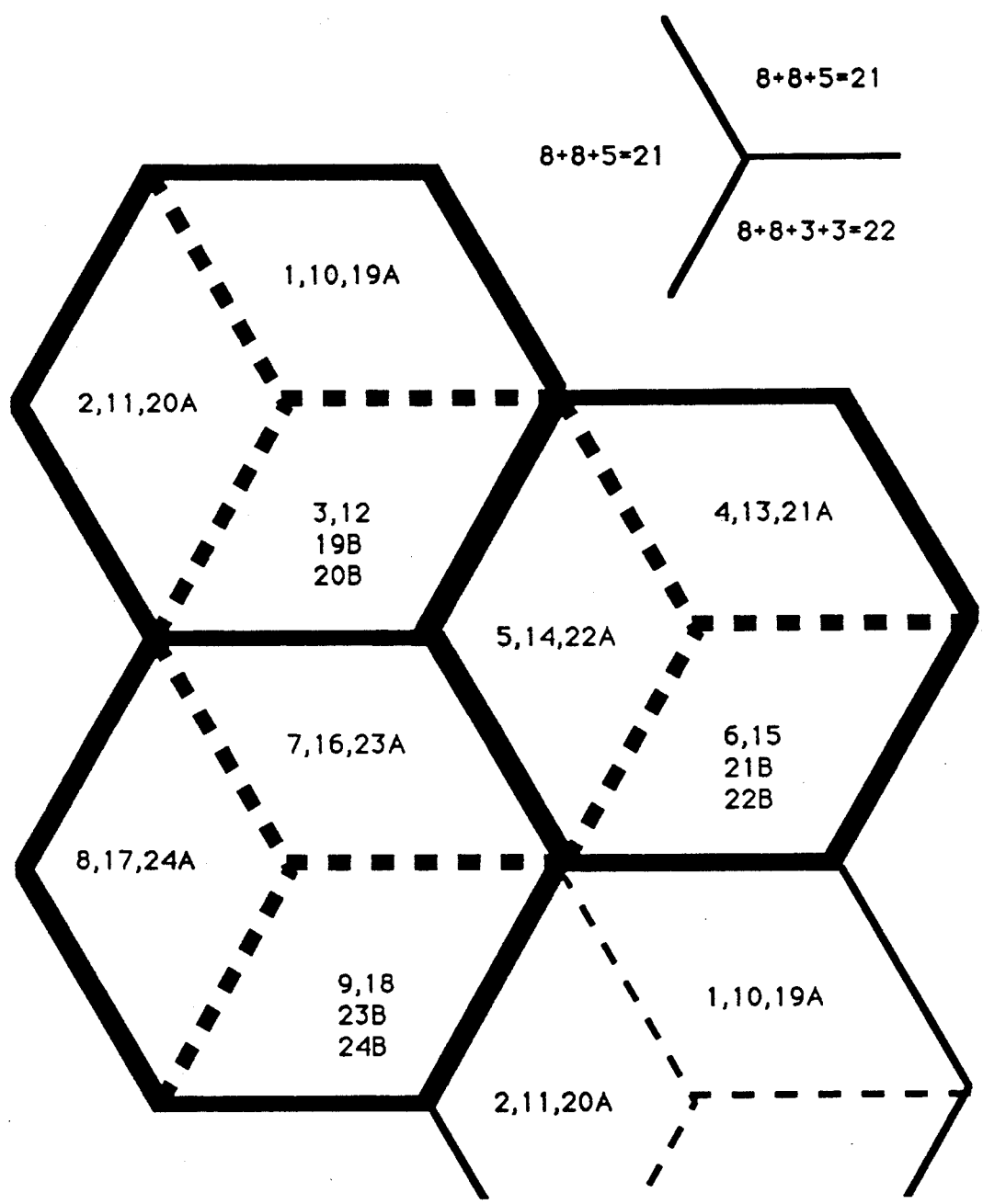
FIG. 2 illustrates cellular frequency planning according to the preferred embodiment of the invention.

FIG. 2 illustrates cellular frequency planning according to the preferred embodiment of the invention.

FIG. 2 illustrates the same (24 carriers×8 time slots=) 192 channels redistributed according to the invention, raising the local minimum channel capacity to 21 and providing parity among adjacent sectors, resulting in greater spectral efficiency.

Certain channel sets (19, 20, 21, 22, 23, and 24) have had their eight-slot frames split in two subframes of an A portion of five slots and a B portion of three slots.

They are allocated between the sectors in time-synchronism with the repeat pattern, thereby avoiding the co-channel interference commonly experienced with sector sharing. Thus, six sectors have two carriers at eight channels each and one carrier at five A channels, or a channel capacity of 21, while three sectors have two carriers at eight channels each and two carriers at three B channels each, or a channel capacity of 22. Accordingly, substantial traffic channel parity has been achieved at 21:21:22, or a nominal stated system capacity increase from 16 to 21 channels. This foregoing allocation assumes time synchronism between all sectors. If all sectors are not time synchronized, each frame cannot be so neatly allocated between sectors. In that case, one A slot and one B slot must go unused to guard against co-channel interference due to loose synchronism or asynchronism between cells (or be reclaimed on lesser-grade-of-service calls). Notwithstanding the channel loss in these loosely synchronized systems, parity would still be achieved at 8+8+4:8+8+4:8+8+2+2 or 20:20:20, with a net increase of 4 over the previous local minimum channel capacity of 16.

Advantageously, the B intervals (say 19B and 20B) could themselves be arranged in time to be non-overlapping in a single frame such that both could be provided via a single, frequency-agile transceiver.

Figure 3:
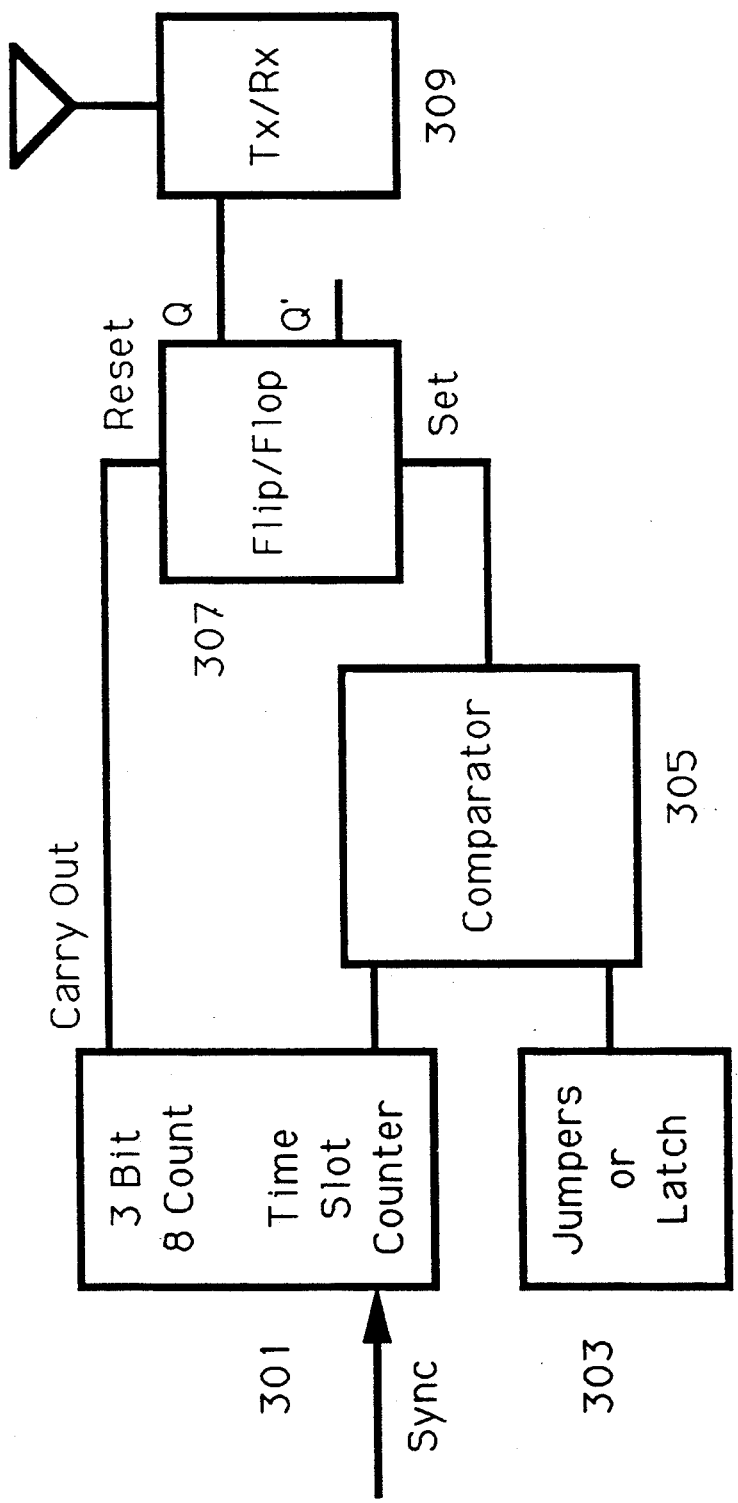
FIG. 3 is a block diagram of an apparatus for predeterminally subdividing a TDM frame according to the instant invention.

FIG. 3 illustrates an apparatus for predeterminally subdividing a TDM frame. It illustrates a three bit (modulo-eight) time slot counter 301 to count the number of time slots per frame, following initial synchronization. A latch 303 holds the predetermined number of time slots allocated; five for an A set and three for a B set, for example. The comparator 305 (or its complimentary output) sets the flip-flop 307 to cause a control signal to be generated, enabling a transceiver 309 in that sector. The modulo-eight counter 301 resets the flip-flop 307 with each new frame.

Thus, in a TDMA cellular system, there has been provided a mechanism for splitting the allocation of time slots within a TDM frame between adjacent coverage areas. There has been provided a method of and apparatus for time-allocation of TDMA channels. It comprises: periodically allocating some portion of a carrier of radio traffic to one coverage area during one time interval and periodically allocating some other portion of that same carrier to another coverage area during a substantially non-overlapping time interval, all in time synchronism with any proximal reuse of that carrier. The distribution of channels in adjacent coverage areas thereby approaches parity and the minimum channel capacity per coverage area is enhanced.

While the preferred embodiment of the invention has been described and shown, it will be appreciated by those skilled in this field that other variations and modifications of this invention may be implemented. For example, although the foregoing discussion has been in terms of balancing or evening the net nominal system capacity, the claimed concept of time-allocation of carriers is equally applicable to providing time-of-day or other capacity increase on a dynamic basis. Similarly, although the discussion has revolved around TDMA channels because of their inherent divisibility, the invention finds utility in cellular systems having other forms of channelization, like conventional sectored-antenna and omni-directional antenna Frequency-Division Multiple Access (FDMA) cellular systems or any omni-directional antenna system where allocation of carriers in time could be implemented (provided time synchronism is established to coordinate co-channel proximal reuses of that carrier in time).

Although the foregoing discussion has been in terms of a fixed and predetermined allocation of channel capacity, dynamic allocation of channel capacity in accordance with the invention is equally feasible for time-of-day capacity needs and the like. Similarly, although the discussion has been in terms of modulo-eight TDM, modulo-three and modulo-six digital cellular systems are in development; this technique is clearly equally applicable to modulo-n systems, whether frequency-hopped or not.

These and all other variations and adaptations are expected to fall within the ambit of the appended claims.

What we claim and desire to secure by Letters Patent is:

1. A method of time-allocation of cellular radio carriers comprising:
   deterministically a carrier of radio traffic to one coverage area during one time interval
   and deterministically allocating that same carrier to another coverage area during a substantially non-overlapping time interval, all in time synchronism with any proximal reuse of that carrier.

2. A method as claimed in claim 1 above, further comprising deterministically allocating yet again that same carrier to yet another coverage area during a substantially non-overlapping time interval, all in time synchronism with any proximal reuse of that carrier.

3. A method as claimed in claim 1 above, wherein such allocation is done periodically.

4. A method as claimed in claim 1 above, wherein such allocation is done perdeterminally.

5. A method as claimed in claim 1 above, wherein such allocation is done dynamically.

6. A method as claimed in claim 1 above, wherein the carrier allocated during the one time interval is a first time slot of a TDM time frame and the carrier allocated during the substantially non-overlapping time interval is a second time slot of the TDM time frame.

7. A method as claimed in claim 1 above, wherein the carrier allocated during the one time interval is a first plurality of time slots of a TDM time frame and carrier allocated during the substantially non-overlapping time interval is a second plurality of the TDM time frame wherein said first and second plurality of time slots respectively comprise five and three time slots in a modulo-8 system-synchronous TDM time frame.

8. A method as claimed in claim 7 above, wherein the carrier is divided into four and two time slots, respectively, in a modulo-8 loosely-synchronous TDM time frame system.

9. A method as claimed in claim 1 above, wherein a frequency-agile radio provides more than one carrier in time synchronism with the system.

10. A method as claimed in claim 1 above, wherein a frequency-agile transceiver provides more than one carrier in time synchronism with the system.

11. A method of time-allocation of cellular radio carriers comprising:
    periodically deterministically allocating a carrier of radio traffic to one coverage area during one time interval
    and periodically deterministically allocating that same carrier to another coverage area during a substantially non-overlapping time interval, all in time synchronism with any proximal reuse of that carrier, whereby the distribution of carriers in adjacent coverage areas approaches parity and the nominal channel capacity per coverage area is enhanced.

12. An apparatus for time-allocation of TDMA channels comprising:

means for periodically deterministically allocating a carrier of radio traffic to one coverage area during one time interval operatively coupled with means for periodically deterministically allocating that same carrier to another coverage area during a substantially non-overlapping time interval, all in time synchronism with any proximal reuse of that carrier, whereby the distribution of carriers in adjacent coverage areas approaches parity and the nominal channel capacity per coverage area is enhanced.

* * * * *

UNITED STATES PATENT AND TRADEMARK OFFICE
CERTIFICATE OF CORRECTION

PATENT NO. : 5,185,739

DATED : February 9, 1993

INVENTOR(S) : Stephen L. Spear

It is certified that error appears in the above-identified patent and that said Letters Patent is hereby corrected as shown below:

In Column 4, line 21, insert -- allocating -- after "deterministically".

Signed and Sealed this

Seventeenth Day of May, 1994

*Attest:*

BRUCE LEHMAN

*Attesting Officer*     *Commissioner of Patents and Trademarks*